(12) United States Patent
Tang et al.

(10) Patent No.: US 11,932,055 B2
(45) Date of Patent: Mar. 19, 2024

(54) HIGH TEMPERATURE-RESISTANT WHEEL

(71) Applicant: BEIJING LESEN TECHNOLOGY CO., LTD, Beijing (CN)

(72) Inventors: Fei Tang, Beijing (CN); Yanlong Xu, Beijing (CN); Gang Luo, Beijing (CN); Jin Chen, Beijing (CN); Mingxu Li, Beijing (CN)

(73) Assignee: BEIJING LESEN TECHNOLOGY CO., LTD, Beijing (CN)

( * ) Notice: Subject to any disclaimer, the term of this patent is extended or adjusted under 35 U.S.C. 154(b) by 414 days.

(21) Appl. No.: 17/280,919

(22) PCT Filed: Dec. 19, 2018

(86) PCT No.: PCT/CN2018/121927
§ 371 (c)(1),
(2) Date: Mar. 29, 2021

(87) PCT Pub. No.: WO2020/062622
PCT Pub. Date: Apr. 2, 2020

(65) Prior Publication Data
US 2022/0041010 A1    Feb. 10, 2022

(30) Foreign Application Priority Data
Sep. 29, 2018  (CN) .......................... 201811145340.8

(51) Int. Cl.
*B60B 9/00*    (2006.01)
*B60B 1/06*    (2006.01)
(Continued)

(52) U.S. Cl.
CPC .................. *B60B 9/00* (2013.01); *B60B 1/06* (2013.01); *B60B 25/002* (2013.01); *B60B 19/10* (2013.01);
(Continued)

(58) Field of Classification Search
CPC ........... B60B 9/00; B60B 1/06; B60B 25/002; B60B 2360/341; B60B 2360/70; B60B 2900/212; B60B 2900/313
See application file for complete search history.

(56) References Cited

U.S. PATENT DOCUMENTS 5,234,259 A * 8/1993 Nishimuro ................ B60B 5/02
411/326
9,346,499 B2 * 5/2016 Rudakevych ...... B62D 55/0885
(Continued)

FOREIGN PATENT DOCUMENTS

CN         203805616 U    9/2014
CN         108116154 A    6/2018
(Continued)

*Primary Examiner* — Scott A Browne
(74) *Attorney, Agent, or Firm* — SOROKER AGMON NORDMAN PTE LTD

(57) ABSTRACT

A high temperature-resistant wheel, comprising: an elastic hub assembly (1), which has a thermal insulation layer integrated therewith so as to insulate the elastic hub assembly (1) from exterior high temperatures; and a rigid wheel barbed ring (2), which has the elastic hub assembly (1) fastened inside and rotates together with the elastic hub assembly (1). A robot, which comprises the high temperature-resistant wheel.

9 Claims, 3 Drawing Sheets

(51) Int. Cl.
   *B60B 25/00*   (2006.01)
   *B60B 19/10*   (2006.01)
(52) U.S. Cl.
   CPC ..... *B60B 2360/341* (2013.01); *B60B 2360/70* (2013.01); *B60B 2900/212* (2013.01); *B60B 2900/313* (2013.01); *B60B 2900/721* (2013.01)

(56) References Cited

U.S. PATENT DOCUMENTS

2011/0248554 A1\* 10/2011 Chon ..................... B60C 7/14
                                                    301/95.101
2016/0243890 A1\* 8/2016 Nishida ................. B60C 7/14

FOREIGN PATENT DOCUMENTS

| CN | 207565228 U | 7/2018 |
| JP | 2015136991 A | 7/2015 |
| KR | 101558380 B1 \* | 10/2015 |

\* cited by examiner

HIGH TEMPERATURE-RESISTANT WHEEL

TECHNICAL FIELD

The present invention relates to the technical field of fire-fighting robots, in particular to a wheel for fire-fighting robot.

BACKGROUND ART

For wheeled mobile robots that need to work in high-temperature environments, their wheels should not only ensure fundamental bearing capability and provide traction force and shock absorption and isolation when interacting with the ground, but also ensure that those key performance indexes are not severely decreased owing to high-temperature creep, stress relaxation and oxidation corrosion of the materials in the high-temperature environments.

At present, there are two main solutions for the wheels of mobile robots used in high-temperature environments: one solution is to reduce the stress by increasing the structural dimensions so as to weaken the influence of high-temperature creep and continuous oxidation on the structure; the advantage of this solution is that the structure is simple, but the disadvantage of this solution is that the structure is heavy, usually is a rigid structure without elasticity; the other solution is to cool continuously and employ forced cooling to ensure that the wheels work at a relatively low temperature, so as to ensure that the mechanical properties of the materials meet the application requirements; the advantage of the solution is that the performance is stable and the wheel structure can be designed based on the existing design, but the disadvantage is that a complex cooling system is required to support the solution and a corresponding substance is required to absorb the heat transferred from the high-temperature environment.

Presently, specialized robots are developed in a trend of intelligence and miniaturization. With the existing solutions for the wheels for robots applied in high-temperature environments, it is difficult to carry out simplification further in terms of the weight or structure owing to the intrinsic design requirements of the solutions; consequently, improvements to the performance indexes of the robots are affected. In addition, since the maximum tolerance temperature is relatively low, the application of high-temperature resistant robots in working locations with high environmental temperature, such as fire-fighting and metallurgical locations, is limited.

SUMMARY OF THE INVENTION

To overcome the drawbacks in the prior art, the object of the present invention is to provide a high-temperature resistant wheel for mobile robot, which utilizes a simple structure to isolate the hub plate from the external high temperature excellently and doesn't require external cooling. Thus the high-temperature resistance property and the service life of the wheel are improved.

To attain the object described above, the present invention provides a high-temperature resistant wheel, which comprises:
an elastic hub assembly integrated with a heat insulating layer for isolating the elastic hub assembly from external high temperature; and a rigid wheel barbed ring, which has the elastic hub assembly fixed inside and rotates together with the elastic hub assembly.

Furthermore, the elastic hub assembly comprises an outer cage, an outer heat insulating layer, an elastic hub plate, an inner heat insulating layer, and an inner cage, wherein, the outer heat insulating layer and the inner heat insulating layer are located at two sides of the elastic hub plate in the axial direction:
the outer cage is located at a side of the outer heat insulating layer opposite to the elastic hub plate;
the inner cage is located at a side of the inner heat insulating layer opposite to the elastic hub plate;
the outer cage, the outer heat insulating layer, the elastic hub plate, the inner heat insulating layer, and the inner cage are installed sequentially to form the elastic hub assembly; the rigid wheel barbed ring is located at the side of the elastic hub assembly, and the transmission shaft of the driving wheel is located at the side of the inner cage.

Furthermore, the rigid wheel barbed ring has a plurality of connecting pins, and the elastic hub assembly has a plurality of connecting holes corresponding to the plurality of connecting pins.

Furthermore, the elastic hub assembly further has bushings that are fitted with a shaft hole to work with the plurality of connecting pins for transferring power, and the bushings are made of ceramic material, coating material, or fiber woven material.

Furthermore, the elastic hub plate has a plurality of spokes, so that the elastic hub plate can achieve large deformation under small strain.

Furthermore, the spoke is a spiral linear curve with constantly variable curvature, one end of the spoke with a smaller bending radius is close to the wheel shaft, and the other end of the spoke with a greater bending radius is close to the outer edge of the elastic hub plate.

Furthermore, the rigid wheel barbed ring is a cage structure and has two rings spaced apart from each other at certain distance in the axial direction and wheel barbs that connect the two rings, wherein a plurality of wheel barbs are arranged in the circumferential direction. Furthermore, the radial outer end of the wheel barb is more outside than the radial outer end of the two rings.

Furthermore, the outer heat insulating layer and the inner heat insulating layer are made of mullite fiber felt or aerogel composite material.

To attain the object described above, the present invention provides a robot, which comprises a wheel, wherein the wheel is the high-temperature resistant wheel described above.

According to the high-temperature resistant wheel disclosed by the present invention, a heat protection layer is integrated into the wheel structure, so that the metal works in a lower temperature range, thereby the structural strength and the service life of the structural members are improved; moreover, by using an all-metal elastic hub, the wheel has certain elasticity, so as to isolate and absorb shocks. A feasible solution of heat-insulated transmission between outer rim and spokes is put forward. The outstanding significance of the solution lies in: as a high-temperature resistant wheel without external cooling, the wheel can be directly integrated into a high-temperature resistant robot, and the wheel has performance similar to traditional tires and can work in a high-temperature environment. Compared with the traditional solutions, the wheel can effectively reduce the weight and volume, and is of great significance for extended application of special high-temperature resistant robots.

Other features and advantages of the present invention will be detailed in the following text and become more obvious partially from the description, or will be understood through implementation of the present invention.

BRIEF DESCRIPTION OF DRAWINGS

The accompanying drawings are provided to help further understanding of the present invention, and constitute a part of the description. These drawings are used in conjunction with the embodiments to interpret the present invention, but don't constitute any limitation to the present invention. In the figures.

EMBODIMENTS

Hereunder some preferred embodiments of the present invention will be described, with reference to the accompanying drawings. It should be understood that the embodiments described here are only provided to describe and interpret the present invention, but don't constitute any limitation to the present invention.

Figure 1:
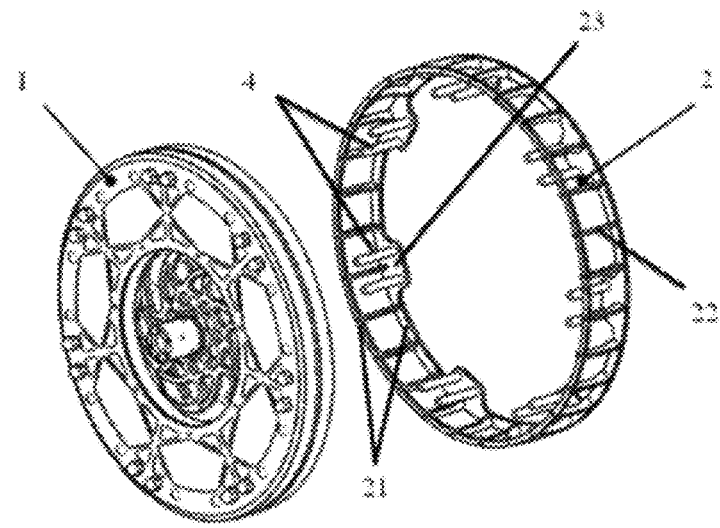
FIG. 1 is a structural view of the high-temperature resistant wheel according to the present invention.
Figure 3:
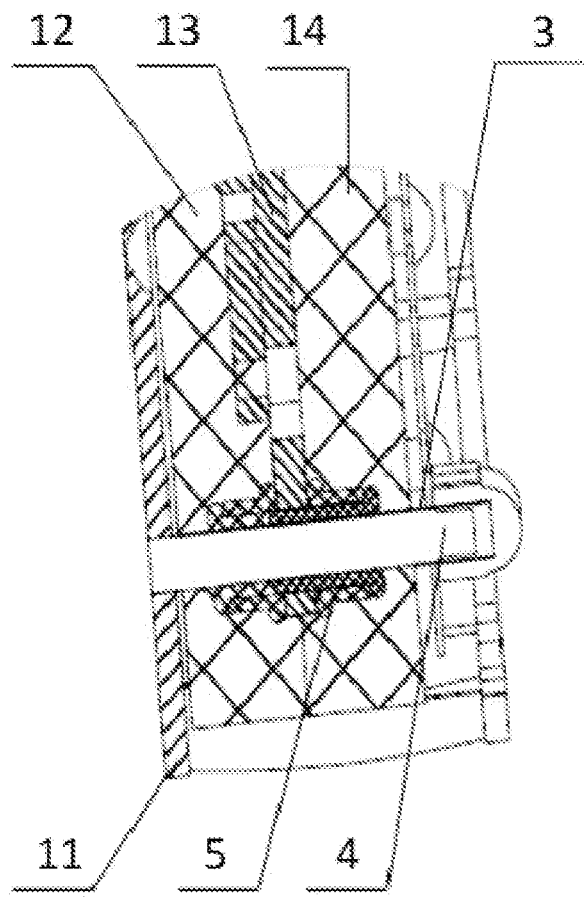
FIG. 3 is a partial enlarged view of the wheel according to the present invention.

Hereunder the structure of the high-temperature resistant wheel in the present invention will be described in detail. FIG. 1 is a structural view of the high-temperature resistant wheel according to the present invention. As shown in FIGS. 1 and 3, the high-temperature resistant wheel according to the present invention comprises an elastic hub assembly 1 and a rigid wheel barbed ring 2. The elastic hub assembly 1 is integrated with a heat insulating layer therein. The elastic hub assembly 1 has a plurality of connecting holes 3. The rigid wheel barbed ring 2 has connecting pins 4 corresponding to the plurality of connecting holes 3. The elastic hub assembly 1 is connected with the rigid wheel barbed ring 2 by inserting the connecting pins 4 into the connecting holes 3. A section of the connecting pin 4 is threaded, and the elastic hub assembly 1 and the rigid wheel barbed ring 2 are fastened by nuts after they are connected.

Figure 2:
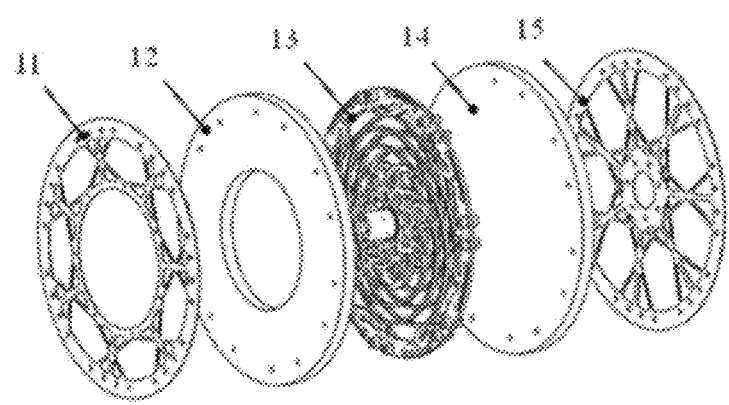
FIG. 2 is an exploded structural view of the elastic hub assembly according to the present invention.
Figure 4:
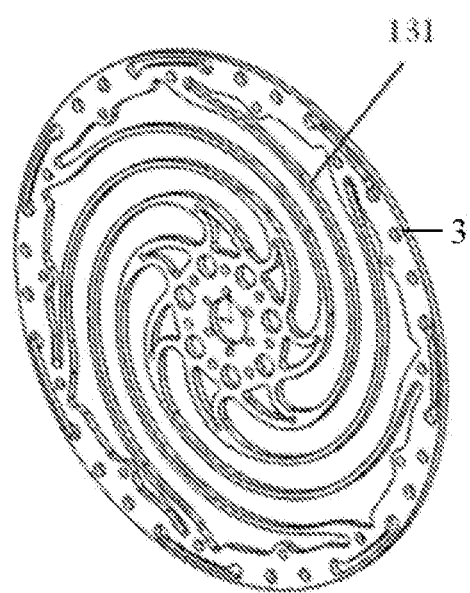
FIG. 4 is a perspective view of the elastic hub plate according to the present invention.
Figure 5:
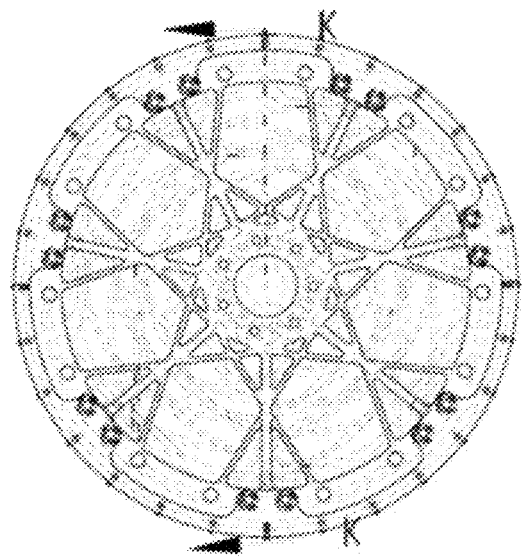
FIG. 5 is a top view of the wheel according to the present invention.
Figure 6:
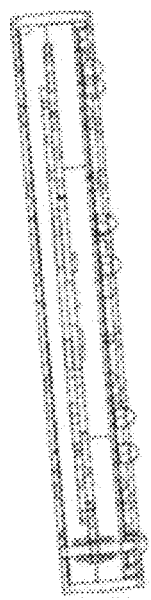
FIG. 6 is a sectional view of the wheel according to the present invention.

As shown in FIG. 2, the elastic hub assembly 1 comprises an inner cage 11, an inner heat insulating layer 12, an elastic hub plate 13, an outer heat insulating layer 14 and an outer cage 15. The inner cage 11 and the outer cage 15 are disc-shaped for holding the elastic hub assembly 1. The inner heat insulating layer 12 and the outer heat insulating layer 14 are disc-shaped and are used for heat insulation for the elastic hub plate 13. A central hole is formed at the center of the inner heat insulating layer 12. Preferably, the outer heat insulating layer 14 has no central hole. The outer heat insulating layer 14 may also has a central hole; in that case, it is necessary to seal the central hole with a heat protective material before use. The inner heat insulating layer 12 and the outer heat insulating layer 14 are made of a heat insulating material, for example, but not limited to, mullite fibers, aerogel, or microporous heat insulating plate, etc., and the material may be selected according to the specific temperature. In this embodiment, the material is mullite fibers, which can withstand 1,600° C. temperature for a long time. The elastic hub plate 13 is disc-shaped and has a plurality of spokes 131. The spokes 131 connect the wheel shaft and the outer rim of the elastic hub plate 13 together. In this embodiment, the spokes 131 are long flexible spokes (see FIG. 4). Preferably, the length of the spoke 131 is greater than the radius, and the spoke 131 is arc-shaped, one end of the spoke 131 is located at the side of the rim, and the other end of the spoke 131 is located at the side of the wheel shaft axially symmetrical with said one end. That is to say, preferably, the spokes 131 are in the form of spiral curves with constantly variable curvature, so that a plurality of swing arms can deform in coordination, and stress concentration is reduced by the slender swing arms. In this embodiment, the swing arm of the spoke 131 is in an involute form, and the end of the spoke 131 with smaller bending radius is close to the wheel shaft, while the end of the spoke 131 with greater bending radius is close to the rim. As shown in FIG. 3, the inner cage 11, the inner heat insulating layer 12, the elastic hub plate 13, the outer heat insulating layer 14 and the outer cage 15 have connecting holes 3 through which the connecting pins 4 of the rigid wheel barbed ring 2 can pass. The outer cage 15, the outer heat insulating layer 14, the elastic hub plate 13, the inner heat insulating layer 12 and the inner cage 11 are installed on the rigid wheel barbed ring 2 sequentially.

The elastic hub assembly 1 plays a role similar to an ordinary hub, i.e., provides a connection between the transmission shaft and the robot. The elastic hub assembly 1 rotates by means of the transmission shaft to move the robot. Owing to the requirement of application in a high-temperature environment, the elastic hub assembly 1 is coated with a thermal insulation layer to control the temperature of the material within the allowable temperature limit of the material. In addition, the elastic hub assembly 1 has high elasticity and is used to absorb the shocks of the robot during the movement.

The main bearing structure of the elastic hub assembly 1 is the elastic hub plate 13. As shown in FIG. 3, the elastic hub plate 13 passes through the plurality of long flexible spokes 131, so that the elastic hub plate 13 can achieve large deformation under small strain (stress). The elastic hub plate 13 is designed in a way that the elastic hub assembly 1 has certain shock absorption and shock resistance effects. The outer layers on both sides of the elastic hub plate 13 are coated with an inner heat insulating layer 12 and an outer heat insulating layer 14 respectively, which play a role of heat insulation to ensure that the elastic hub plate 13 works at a lower temperature and prevent the elastic hub plate 13 from being oxidized. The inner heat insulating layer 12 and the outer heat insulating layer 14 are fixed on the elastic hub plate 13 by means of the inner cage 11 and the outer cage 15. Besides, the long flexible spokes 131 can lengthen the thermal path between the rim of the elastic hub plate 13 that has relatively high temperature and the wheel shaft, thus keeping the coupling end at a lower temperature.

The rigid wheel barbed ring 2 has a cage structure (with a drum-shaped outer contour). The rigid wheel barbed ring 2 has two rings 21 spaced apart from each other by a certain distance in the axial direction and a plurality of connecting parts 22 arranged at an equal interval in the circumferential direction for connecting the two rings 21. The rigid wheel barbed ring 2 further has a plurality of protrusions 23 extending radially inward from one ring 21 and a plurality of connecting pins 4 extending axially toward the other ring 21 at the protrusions 23. In this embodiment, preferably, a plurality of protrusions 23 are arranged at an equal interval in the circumferential direction, but the present invention is not limited to that arrangement, as long as 3 or more protrusions are provided. In addition, in this embodiment, preferably, two connecting pins 4 are provided in one protrusion 23, and the connecting pins 4 are welded on the protrusion 23, but the present invention is not limited to that arrangement. In this embodiment, preferably, connecting pins 4 are used, but alternatively the connections may be made by bolts, screws or the like. In this embodiment, preferably the plurality of connecting parts 22 are wheel barbs 22 for connecting the two rings 21, and the radial outer end of the wheel barb 22 is more outside radially than the radial outer end of the two rings 21, so that the robot can move over obstacles more easily.

As shown in FIG. 3, in the case that the connecting pins 4 are used, ceramic bushings 5 are preferably used in the elastic hub assembly 1 to form shaft-hole fitting for power transmission. The ceramic bushings 5 have enough rigidity to ensure normal transmission and have a heat insulation property. The connecting pins 4 are distributed at an equal interval in the circumferential direction, so as to balance the load on the ceramic bushings 5 and prevent the ceramic bushings 5 from broken owing to shocks. It should be noted that the materials with a heat insulation property are usually loose and brittle materials. Therefore, if a different material is used to replace the ceramic bushings 5, a tradeoff must be made among heat insulation, strength and impact toughness properties. Other feasible bushings include coating material and fiber woven material.

The rigid wheel barbed ring 2 is mainly used to provide a drum-shaped outer contour required for the wheel to run and the wheel barbs required for moving over obstacles. In view that the rigid wheel barbed ring 2 is in contact with the ground for a long time during operation and may be worn or damaged by impact, it should be easy to remove and replace.

The high-temperature resistant wheel according to the present invention can be used for machines that work in high-temperature environments, such as robots and mobile cars, etc.

According to the high-temperature resistant wheel of the present invention, a heat protection layer is integrated into the wheel structure, so that the metal works in a lower temperature range, thereby the structural strength and the service life of the structural members are improved; moreover, by using an all-metal elastic hub, the wheel has certain elasticity, so as to isolate and absorb shocks.

The high-temperature resistant wheel according to the present invention doesn't require external cooling, and can be directly integrated into a high-temperature resistant robot, and the wheel has performance similar to traditional tires and can work in a high-temperature environment. Compared with the traditional solutions, the wheel can effectively reduce the weight and volume, and is of great significance for extended application of special high-temperature resistant robots.

Those skilled in the art should appreciate: the embodiments described above are only some preferred embodiments of the present invention, and should not be deemed as constituting any limitation to the present invention. Though the present invention is described and illustrated in detail with reference to the embodiments, those skilled in the art can easily make modifications to the technical solution described above in the embodiments or make equivalent replacement of some technical features. Any modification, equivalent replacement, or improvement made to the embodiments without departing from the spirit and the principle of the present invention shall be deemed as falling into the scope of protection of the present invention.

The invention claimed is:

1. A high-temperature resistant wheel, comprising an elastic hub assembly integrated with a heat insulating layer for isolating the elastic hub assembly from external high temperature; and
   a wheel barbed ring, which has the elastic hub assembly fixed inside and rotates together with the elastic hub assembly, wherein
   the elastic hub assembly comprises an outer cage, an outer heat insulating layer, an elastic hub plate, an inner heat insulating layer, and an inner cage, wherein
   the outer heat insulating layer and the inner heat insulating layer are located at two sides of the elastic hub plate in the axial direction;
   the outer cage is located at a side of the outer heat insulating layer opposite to the elastic hub plate;
   the inner cage is located at a side of the inner heat insulating layer opposite to the elastic hub plate;
   the outer cage, the outer heat insulating layer, the elastic hub plate, the inner heat insulating layer, and the inner cage are installed sequentially to form the elastic hub assembly.

2. The high-temperature resistant wheel according to claim 1, wherein
   the wheel barbed ring has a plurality of connecting pins, and the elastic hub assembly has a plurality of connecting holes corresponding to the plurality of connecting pins.

3. The high-temperature resistant wheel according to claim 2, wherein
   the elastic hub assembly further has bushings that are fitted with a shaft hole to work with the plurality of connecting pins for transferring power, and the bushings are made of ceramic material, coating material, or fiber woven material.

4. The high-temperature resistant wheel according to claim 1, wherein
   the elastic hub plate having a plurality of spokes, the elastic hub plate configured such that the when the elastic hub plate deforms, deformation of each of the plurality of spokes is greater than deformation of other parts of the elastic hub plate.

5. The high-temperature resistant wheel according to claim 4, wherein
   each of the plurality of spokes is a spiral curve with constantly variable curvature, each of the plurality of spokes having;
   a first end proximate to a wheel shaft and having a first bending radius; and
   a second end proximate to an outer edge of the elastic hub plate and having a second bending radius, wherein the first bending radius is smaller than the second bending radius.

6. The high-temperature resistant wheel according to claim 1, wherein
   the wheel barbed ring is a cage structure and has two rings spaced apart from each other at certain distance in the axial direction and wheel barbs that connect the two rings, wherein a plurality of wheel barbs are arranged in the circumferential direction.

7. The high-temperature resistant wheel according to claim 6, wherein
   the plurality of wheel barbs each have a radial outer end that is more outside radially than a radial outer end of the two rings.

8. The high-temperature resistant wheel according to claim 1, wherein
the outer heat insulating layer and the inner heat insulating layer are made of one or more of mullite fiber felt, aerogel composite material, and microporous heat insulating plate.

9. A robot comprising a wheel, wherein the wheel is the high-temperature resistant wheel according to claim 1.

* * * * *